United States Patent [19]
Fenton et al.

[11] 3,747,340
[45] July 24, 1973

[54] FLAME SENSING SYSTEM FOR A TURBINE ENGINE

[75] Inventors: James E. Fenton, Ann Arbor; Rogelio G. Samson, Birmingham; Thomas M. Sebestyeh, Ann Arbor, all of Mich.

[73] Assignee: Ford Motor Company, Dearborn, Mich.

[22] Filed: Aug. 12, 1971

[21] Appl. No.: 171,228

[52] U.S. Cl. .............................. 60/223, 60/39.28 T
[51] Int. Cl. .............................................. F02k 3/00
[58] Field of Search ................ 60/39.28 R, 39.28 T, 60/39.03

[56] References Cited
UNITED STATES PATENTS

| | | | |
|---|---|---|---|
| 2,971,338 | 2/1961 | Bodemuller | 60/39.28 T |
| 3,128,603 | 4/1964 | Haigh | 60/39.28 T |
| 3,158,996 | 12/1964 | Herbert | 60/39.28 T |
| 2,796,733 | 6/1957 | Pearl | 60/39.28 T |
| 2,830,437 | 4/1958 | Woodward | 60/39.28 T |
| 2,851,855 | 9/1958 | Gamble | 60/39.28 R |
| 2,857,742 | 10/1958 | Drake | 60/39.28 T |
| 3,067,576 | 12/1962 | Campbell | 60/39.28 T |
| 3,478,512 | 11/1969 | Brahm | 60/39.28 R |
| 3,648,033 | 3/1972 | Bader | 60/39.28 T |

Primary Examiner—Clarence R. Gordon
Attorney—Keith L. Zerschling et al.

[57] ABSTRACT

The temperature difference between the combustion products leaving a combustion chamber and the air entering the combustion chamber is compared with a reference value that is based on the mass ratio of the fuel and air supplied to the combustion chamber. A positive output signal indicates the presence of a flame while a negative output signal indicates a flameout. The inexpensive system operates effectively throughout all phases of engine operation.

9 Claims, 3 Drawing Figures

FLAME SENSING SYSTEM FOR A TURBINE ENGINE

SUMMARY OF THE INVENTION

Losing the flame in the combustion chamber of a turbine engine can be caused by a variety of circumstances and generally must be attended by an immediate attempt at reestablishing the flame or stopping fuel flow to the engine. Failure to sense the flameout and initiate appropriate action can result in considerable accumulation of fuel in the engine. On the other hand, signaling the presence of a flameout when one actually has not occurred unnecessarily disrupts engine operation. Virtually every turbine engine includes some technique of detecting the presence or absence of a flame in the combustion chamber, and considerable effort has been expended in improving the accuracy and reliability of such flame sensing systems. Light sensors of the ultraviolet, infrared or visible type are used in many of such flame sensing systems even though such sensors have high initial cost, low life, and low reliability.

This invention provides an inexpensive flame sensing system for a gas turbine engine having a combustion chamber for combusting the fuel-air mixture, an air supply mechanism for supplying air to the combustion chamber and a fuel supply mechanism for supplying fuel to the combustion chamber. The system comprises a first temperature sensing device for producing a first temperature signal representing the temperature of the combustion products leaving the combustion chamber and a second temperature sensing device for producing a second temperature signal that represents the temperature of the air being supplied to the combustion chamber. A fuel flow sensing device coupled to the fuel supply mechanism produces a signal representing the mass flow rate of the fuel being supplied to the combustion chamber. The signal from the fuel flow sensing device is converted into a reference signal that is subtracted from the difference between the first temperature signal and the second temperature signal. An output device examines the resulting signal and indicates the presence or absence of a flame.

Improved accuracy is achieved by using a signal representing the mass flow rate of the air being supplied to the combustion chamber to convert the fuel signal into the reference signal. Dividing the fuel signal by the air signal produces a reference signal proportional to the fuel-air ratio of the combustible mixture produced in the combustion chamber.

The fuel flow sensing device can be a flow meter installed in the fuel line leading to the combustion chamber. To avoid the expense of such flow meters, the fuel flow sensing device can comprise a simple electronic circuit that produces a representative fuel flow signal by comparing the gas generator speed demanded by the engine operator with the actual gas generator speed.

The air flow sensing device can be installed anywhere in the gas flow path of the engine although it preferably is installed in the relatively cool air entering the regenerator. A representative air flow signal can be obtained inexpensively from the rotational speed of the gas generator section of the engine. The relationship between actual air flow and gas generator speed is affected slightly by variations in ambient temperature and pressure but a sufficient temperature difference exists between flame and flameout to accommodate such variations in most automotive applications.

Conventional thermocouples having long useful lives and excellent reliability can be used to provide the temperature signals. The temperature of the combustion products can change very rapidly at rates far exceeding the response rate of its thermocouple, and improved results are achieved by providing time lead compensation for the first temperature sensing device so its temperature signal represents the actual temperature of the combustion products. A precalibrated time lead compensating circuit that responds to very small changes in the signal from the thermocouple to produce a signal representing the actual temperature of the combustion products insures proper operation of the overall system. The time lead compensating circuit preferably provides such compensation as a function of gas generator speed. A filter circuit preferably receives the output signal from the lead compensating circuit to remove spurious noise and insignificant short term responses. One of the signals preferably is biased slightly by a bias circuit to compensate for dynamic operating characteristics.

Other electrical and electronic components in the system are inexpensive and extremely reliable. The system operates effectively throughout all operating modes of the engine including rapid accelerations and decelerations, and it can produce a digital type output signal that is positive when a flame is present and negative in the absence of a flame, or vice versa.

DETAILED DESCRIPTION

Figure 1:
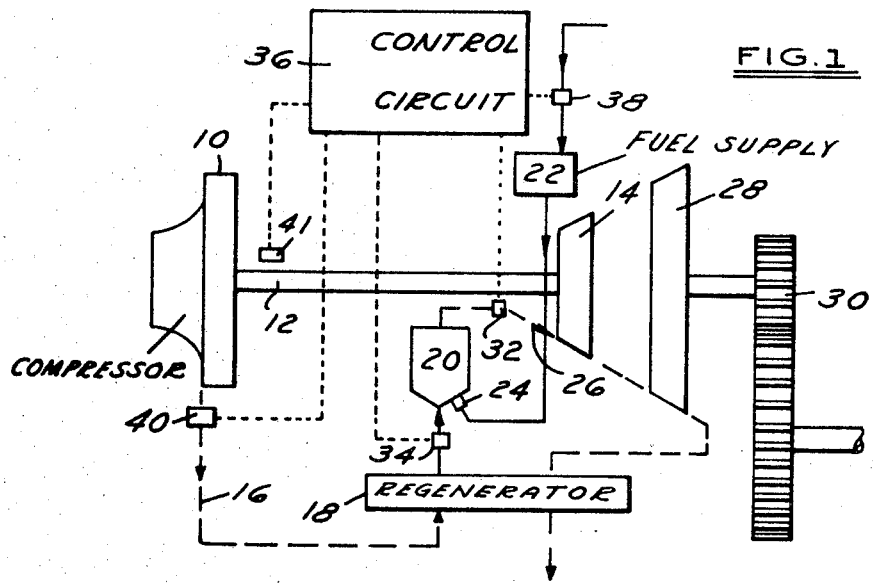
FIG. 1 is a schematic presentation of an automotive type gas turbine engine showing the relationship of various elements of the sensing system to the major components of the engine.

Referring to FIG. 1, a gas turbine engine comprises a compressor 10 connected directly by a shaft 12 to a compressor turbine 14. Compressed air leaving compressor 10 follows the dashed line indicated by numeral 16 to pass through one sector of a rotating regenerator 18 and then enter a combustion chamber 20. A fuel supply mechanism 22 receives fuel from a fuel source (not shown) and supplies the fuel to a fuel supply nozzle 24 located in combustion chamber 20.

The fuel and air are ignited within combustion chamber 20 and the combustion products leaving the combustion chamber flow as indicated by dashed line 26 through the compressor turbine 14. Combustion products leaving turbine 14 pass through a power turbine 28 and then flow through the other sector of rotating regenerator 18. Power turbine 28 is connected to appropriate gearing 30 that in turn is connected to an appropriate power output device.

Combustion products passing through compressor turbine 14 supply sufficient power thereto to drive the gas generator section of the engine, which is made up of items 10–24. Regenerator 18 is driven mechanically from turbine 14 and the rotation of the regenerator transfers heat from the combustion products leaving the power turbine to the air entering the combustion chamber.

A temperature sensor 32 is located in the stream of the combustion products leaving combustor 20 and another temeprature sensor 34 is located in the air stream entering combustion chamber 20. Temperature sensor 32 typically is a chromel-alumel or platinel thermocouple and temperature sensor 34 typically is a resistance thermometer or thermistor. The signals produced by the temperature sensors are supplied to control circuitry represented by numeral 36. Control circuitry 36 also receives a signal from a sensor 38 that represents the fuel flow being supplied to the combustion chamber and a signal from a sensor 40 that represents the air flow being supplied to the combustion chamber. A speed sensor 41 supplies circuitry 36 with a signal representing the rotational speed of the gas generator section.

Figure 2:
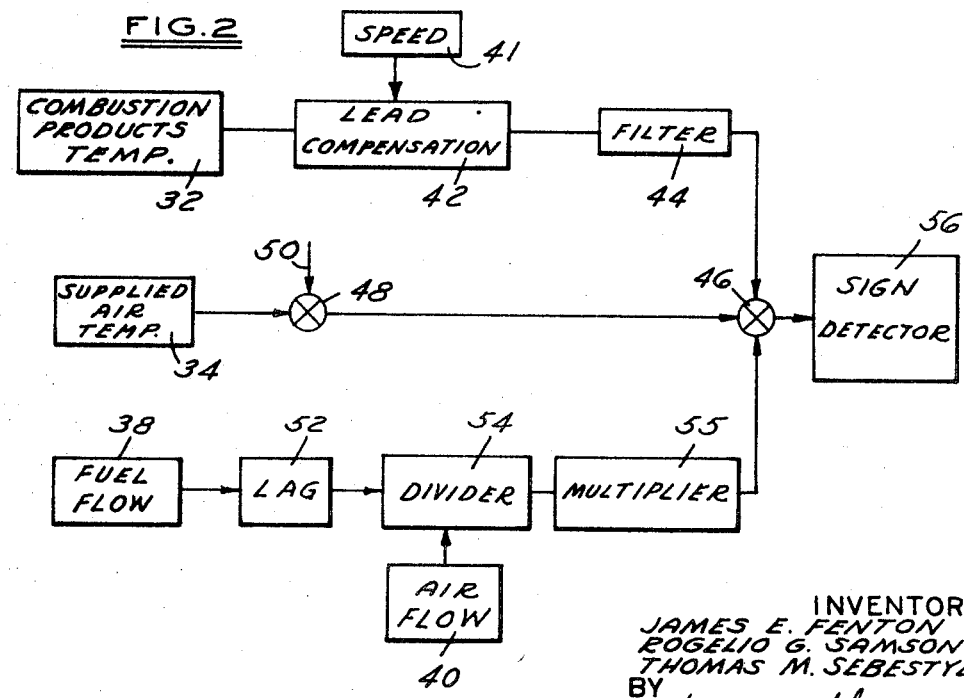
FIG. 2 is a block diagram of the system of this invention.

FIG. 2 is a block diagram of control circuitry 36. Temperature sensor 32 and speed sensor 41 are connected to a lead compensation circuit 42. The output of circuit 42 is connected to a filter circuit 44 and the output of filter circuit 44 is supplied to a summing device 46.

Temperature sensor 34 is coupled to a bias circuit 48 that also receives a predetermined bias input 50. Bias input 50 is included to prevent an erroneous flameout signal under certain dynamic situations. A typical bias input represents a negative 100°–150F°. The output of bias circuit 48 is applied to summing circuit 46.

Fuel flow sensor 38 is coupled through a lag circuit 52 to a divider circuit 54. Lag circuit 52 compensates the fuel flow signal for the time required to transport the fuel to the combustor and the time required to burn the fuel. Divider circuit 54 also receives an input signal from air flow sensor 40 and its output is supplied to summing circuit 46. The output of summing circuit 46 is supplied to a sign detector 56.

Lead compensation circuit 42 is an empirically calibrated function generator that responds to small changes in the output signal from temperature sensor 32 and converts those changes into a temperature signal representative of the actual temperature of the combustion products. The circuit is calibrated according to engine parameters, and best results are achieved when the lead is a function of the gas generator speed supplied by speed sensor 41. In most cases, the lead decreases with increasing engine speed. Filter circuit 44 filters the output of circuit 42 to remove spurious noise and to smooth short term changes.

Divider circuit 54 divides the fuel flow signal received from sensor 38 by the air flow signal received from sensor 40 to produce a signal representing the fuel-air ratio of the mixture supplied to the combustion chamber. Multiplier circuit 55 then multiplies that fuel-air ratio signal by a constant representing the realizable heat content of the fuel and supplies the result to summing circuit 46.

Summing circuit 46 subtracts the signals of bias circuit 48 and muliplier circuit 55 from the signal of filter circuit 44 and applies the result to sign detector 56. If sign detector 56 receives a positive value, it indicates the presence of a flame in the combustion chamber. If sign detector 56 receives a negative signal, it indicates the presence of a flameout and it actuates appropriate circuitry that halts fuel flow, attempts relighting or initiates other desired action.

Engine deceleration can produce a situation where the temperature of the combustion products almost equals the temperature of the air entering the combustion chamber. An acceleration demand immediately following such deceleration can increase the fuel flow signal sufficiently so the temperature difference less the fuel flow signal produces a negative value. Bias input 50 compensates effectively for such situations. The bias can be applied to the combustion products temperature signal or the fuel signal if desired.

The system can be simplified considerably without any significant depreciation of its performance by substituting the signal from speed sensor 41 for the air flow signal of sensor 40. In most automotive type turbine engines, air flow is proportional to gas generator speed and such substitution eliminates the need for a relatively expensive air flow sensor.

Figure 3:
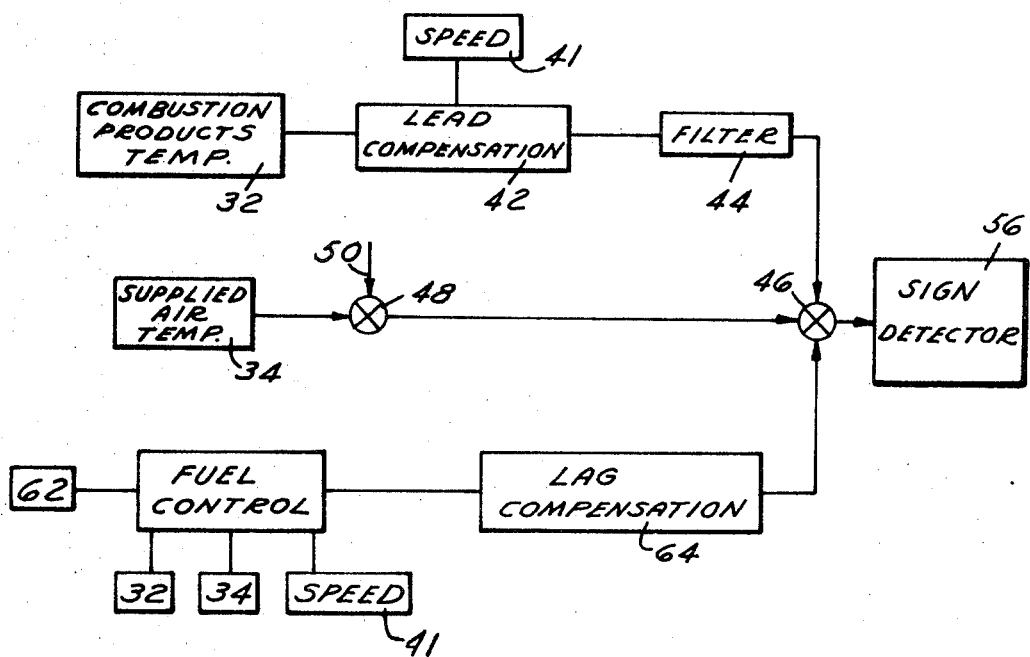
FIG. 3 illustrates an improved version of the system that reduces component costs and assembly complexity without depreciating response and accuracy.

A signal representing the fuel-air ratio can be obtained from the fuel flow control mechanism used on most automotive turbine engines. Referring to FIG. 3, a typical fuel flow control mechanism 60 receives input signals from speed sensor 41, combustion products temperature sensor 32, inlet air temperature sensor 34, and an engine throttle position sensor 62. The throttle position sensor represents the desired gas generator speed. Flow control mechansim 60 compares desired gas generator speed with the other inputs to determine the fuel flow rate to the engine that will achieve the desired speed without producing excessive stresses or temperatures.

The output signal from the flow control mechanism thus is a function of the fuel-air ratio, and that output signal is applied to a lag compensation circuit 64. Circuit 64 compensates the signal for transportation and burning time and then applies the signal to summing circuit 46.

A multiplier circuit can be included to multiply the output signal from the flow control mechanism by a constant representing the realizable heat content of the fuel although effective multiplication can be accomplished by appropriate calibration of any of the other signals. In some cases, the output signal must be divided by an air flow signal to obtain an accurate representation of the fuel-air ratio.

Thus this invention provides a reliable, inexpensive system for sensing the presence or absence of a flame in the combustion chamber of a turbine engine. The system is useful particularly in automotive type turbine engines but it can be used also in other turbine applications.

We claim:

1. In a gas turbine engine having a combustion chamber for combusting a fuel-air mixture, air supply means for supplying air to the combustion chamber and fuel supply means for supplying fuel to the combustion chamber, a system for sensing a flameout comprising
first temperature sensing means for producing a first temperature signal representing the temperature of the combustion products leaving the combustion chamber,
second temperature sensing means for producing a second temperature signal representing the temperature of the air being supplied to the combustion chamber,
fuel flow rate sensing means coupled to said fuel supply means for producing a fuel signal, and
output means coupled to both temperature sensing means and said fuel flow sensing means for producing an output signal indicating the presence or absence of a flame in the combustion chamber.

2. The engine of claim 1 comprising air flow sensing means for producing an air signal representing the rate at which air is being supplied to the combustion chamber, divider means for dividing said fuel signal by said air signal to produce a signal representing the fuel-air ratio, and multiplier means for multiplying the signal representing the fuel-air ratio by a constant representing the realizable heat content of the fuel, said output means subtracting the second temperature signal and the output of said multiplier means from said first temperature signal.

3. The engine of claim 2 in which the air flow sensing means comprises a speed sensing means for sensing the rotational speed of the gas generator section of the engine.

4. The engine of claim 3 in which the first temperature sensing means comprises a thermocouple and a lead compensating means connected to said thermocouple, said lead compensating means adjusting the output of said thermocouple so said output represents the actual temperature of the combustion products.

5. The engine of claim 4 in which the lead compensating means adjusts the output of the thermocouple as a function of gas generator speed.

6. The engine of claim 5 comprising a bias circuit for compensating one of the signals applied to the output means for dynamic operating characteristics.

7. The engine of claim 1 in which the first temperature sensing means comprises a thermocouple and a lead compensating means connected to said thermocouple, said lead compensating means adjusting the output of said thermocouple so said output represents the actual temperature of the combustion products.

8. The engine of claim 7 in which the lead compensating means adjusts the output of the thermocouple as a function of gas generator speed.

9. The engine of claim 1 comprising a bias circuit for compensating one of the signals applied to the output means for dynamic operating characteristics.

* * * * *